Feb. 22, 1949.   A. L. SPANGENBERG   2,462,138
METHOD OF MAKING SELF-ALIGNING BALL BEARINGS
Filed Nov. 28, 1945

INVENTOR.
Alfred L. Spangenberg,
BY
ATTORNEY.

Patented Feb. 22, 1949

2,462,138

UNITED STATES PATENT OFFICE 2,462,138

METHOD OF MAKING SELF-ALIGNING BALL BEARINGS

Alfred L. Spangenberg, Los Angeles, Calif., assignor to Halfco. Inc., Los Angeles, Calif., a corporation of California Application November 28, 1945, Serial No. 631,246

3 Claims. (Cl. 29—149.5)

1

The present invention relates to a method of making a self-aligning ball bearing and method of securing a ball in an annulus.

Self-aligning ball bearings are utilized in numerous industries, notable among which is the aeronautic. Specifically, such self-aligning ball bearings are of particular advantage when incorporated in various devices such as for instance in the end of a rod. These rods with the self-aligning ball bearings are often used for controls of various forms such as for the shutters of an engine.

The inventor is aware that various self-aligning ball bearings are now on the market, but so far as the inventor knows such self-aligning ball bearings are not entirely practical in actual use and service. One notable objection prevalent in the present devices is the tendency of the race member to separate from the ball. Another defect is the tendency of the ball and race to be either too tight and therefore binding and not free-acting, or to have too great a working tolerance.

The present invention overcomes the defects above enumerated in that an exact tolerance may be secured between the ball and its race and wherein the ball and race assembly will not separate under normal use.

Another object of the invention is the provision of a self-aligning ball bearing which may be rapidly and accurately formed to provide a precision product.

2

Figures 8, 9:
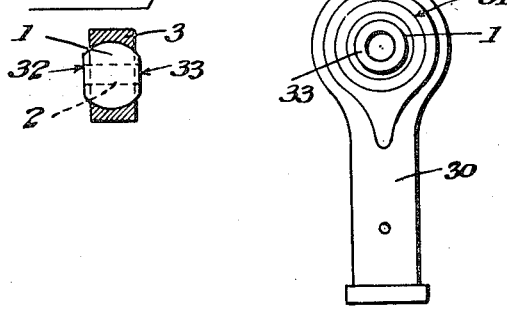
Fig. 8 is an end elevation partly cut away to show the ball in position within the finished race.

Fig. 9 is an elevation of one adaptation of the invention.

Referring now to the drawings, in which are illustrated the steps followed in the practice of the present invention, I is a ball provided with an axial bore 2. This ball is to be positioned within a race member 3 in such a manner as to turn therein.

Figure 1:
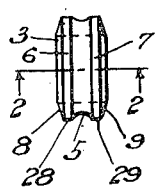
Fig. 1 is an elevation of a race member which may be utilized in the practice of the invention.
Figure 2:
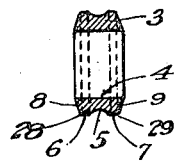
Fig. 2 is a transverse section on the line 2—2 of Fig. 1.
Figure 3:
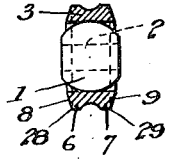
Fig. 3 is a transverse section of the race member shown in Fig. 1 with a ball in elevation.

The race member 3 constitutes an annulus, the bore 4 of which is adapted to receive the ball 1, as indicated in Fig. 3. The diameter of the bore 4 closely approximates, within a few thousandths of an inch, the diameter of the ball 1. The race member has a keystone appearance in cross section, as illustrated in Fig. 2, in that the outer surface is provided with an annular concavity 5, positioned midway between ends of the race member, two annular walls 6 and 7 of equal diameter and substantially paralleling the axis, and a pair of tapered or inclined end walls 8 and 9 which lie between the bore 4 and the annular walls 6 and 7.

It will be observed that the race member is in one piece, and in the practice of the invention this race member is die swaged about the ball so as to in part enclose the ball and still allow the ball to turn freely therein. It is necessary that the spacing between the ball and the race member be within certain tolerances so as to be neither too tight nor too loose, and it is also essential that the race member should engage sufficient of the periphery of the ball to assure that the ball will at all times remain within said race member.

Figure 4:
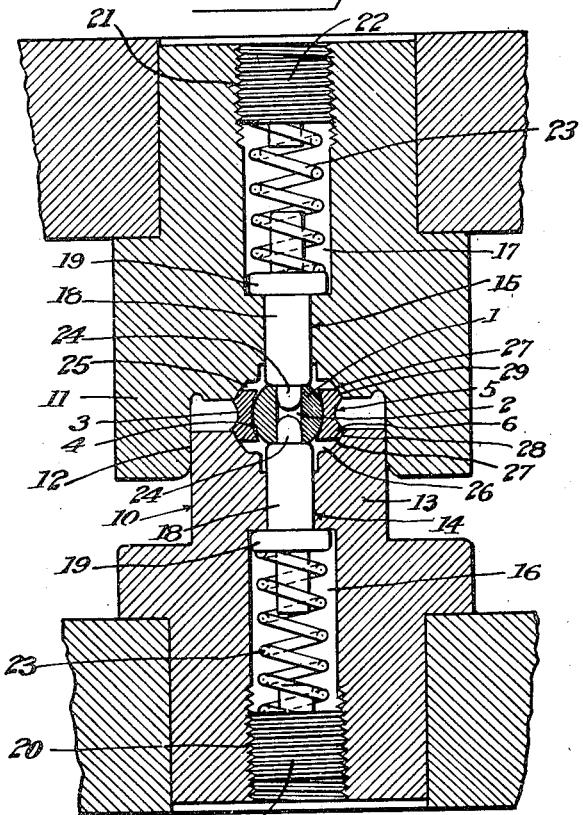
Fig. 4 is a vertical section of the die swaging machine in the act of die swaging the race member about the ball.

In Fig. 4 I have illustrated a device which may be used for the purpose of die swaging the race member about the ball, and wherein is provided a pair of dies 10 and 11. Die 11 is provided with a circular recess 12 to receive the protruding portion 13, to guide the two dies when in cooperative engagement with work. Both dies are provided with central bores 14 and 15 which communicate with enlarged counterbores 16 and 17. Bores 14 and 15 are adapted to receive guide pins designed generally as 18; said guide pins in each instance are provided with an annular flange 19, which fits within the bores 16 and 17. The wall bounding the counterbores is screwthreaded at 20 and 21 to receive adjusting screws designated generally as 22. Interposed between the guide pins and the adjusting screws and within the counterbores are coil springs 23. Each guide pin is provided with a central reduced diameter portion 24 adapted to fit within the bore 2 of the ball. The upper and lower dies are provided with circular recesses 25 and 26; each recess has an outwardly inclined side wall 27, coaxial with a guide pin.

The upper die member 11 is attached to a suitable plunger so as to have a forcible downward movement against work positioned within the lower die and held centered by the pin 18.

Figure 5:
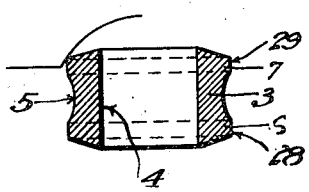
Fig. 5 is an enlarged fragmentary sectional view of a portion of the race member prior to swaging.
Figure 6:
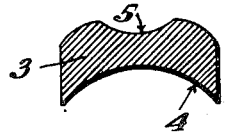
Fig. 6 is an enlarged fragmentary sectional view of the race member after swaging.
Figure 7:
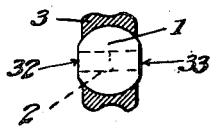
Fig. 7 is an end elevation of the race member after the swaging operation and prior to sizing, the bore of the ball being shown therein in dotted lines.

In the preferred practice of the invention the opening 4 of the race member or the ball is covered with a grease. This grease should have a high viscosity. The grease is applied to the race member at room temperature, assuming room temperature to be 80° F. After application of the grease, the temperature is reduced to approximately 40° F. The race member and the ball are then placed in the bottom die member in the position illustrated in Fig. 4, wherein the hole in the ball is centered by the guide pin, and the race member has the annular wall 6 positioned on the inclined or beveled surface 27. It will be observed that when the work is positioned on the lower die as aforesaid that the inclined surface 27 engages the annular edge 28 of the race member. See Fig. 4. When the upper die 11 descends, the part 24 of the guide pin 18 will enter the hole of the ball, and the inclined edge 27 will engage the edge 29 of the race member, in the same manner as the inclined surface 27 engages edge 28, as illustrated in Fig. 4. As pressure is applied to the work by the two dies, the race member is swaged inwardly around the periphery of the ball, as illustrated in Fig. 6, the inclined edges 8 and 9 moving from the position shown in Fig. 5 to that of Fig. 6, wherein said edges now provide plane surfaces substantially vertical to the axis of the race member, while the surfaces 6 and 7 which were formerly in the same plane now are oppositely inclined, as best shown in Fig. 7. The concavity 5 is gradually forced outwardly so that this portion is substantially flat. As the transverse thickness of the ball race member varies due to the presence of the central concavity 5, this portion has the least resistance to deformation when the dies are brought into contact with the edges 28 and 29; hence ends of the ball race are easily deformed or swaged downwardly. The finished die swaging operation results in the race member assuming the appearance shown in Fig. 7.

The viscosity of the grease is increased by the lowered temperature of 40° F. or less and still clings to the interlockable surfaces as a film after the swaging operation. The ball with its race member is now placed in a solvent for the purpose of removing the grease from between the race member and the ball, which will result in the desired clearance between the working surfaces of the race member and the ball. The device may be placed in a lathe and the outer surface trimmed to remove a portion of the race member and to give it the desired outside diameter, the final appearance being that indicated in Fig. 8.

An adaptation of the invention is shown in Fig. 9, wherein a post 30 is formed to receive the race member, the said post being provided with an opening 31 and the race member being fitted therein. The fit may be a pressed one, or the race member may be otherwise held within the said opening. The tolerance to be maintained between the ball and the race member is controlled by the viscosity of the grease film used on the inner surface of the race member, as well as on the periphery of the ball. Tolerance between the ball and its race is regulated by controlling the viscosity of the grease; the viscosity of the grease in turn is controlled by temperature in the preferred practice. I have found, by way of example, that a grease manufactured by the Chicago Manufacturing & Distributing Company, Chicago, Illinois, and known as Center Point Lube, performs very satisfactorily in the practice of the present invention. This particular grease contains substantially 50% mineral oil, 41.5% petroleum, the remaining percentage being made up of additives such as sulphur and chlorine. The use of the additives controls the film strength or shear strength of the grease. The particular grease named, using the viscosity scale of Saybolt Universal, is at 180° F. 181 secs.=39.5 centistokes; at 90° F.—4880 secs.=1100 centistokes; at 70° F.—15500 secs.=3500 centistokes. This particular type of grease is used in deep drawing, swaging, lathe centers, and other places, and has been found to withstand 50,000 lbs. per square inch pressure. This grease is characterized in that it has good adhesive qualities. It is essential in a swaging operation such as used in the practice of the present invention that the grease should stay between the ball and the race during the swaging operation, otherwise there might be spots without grease which would cause the ball after the grease is washed away to bind within the race. By controlling the temperature after the grease has been applied between the ball and the race, I am able to obtain different tolerances between the ball and race by increasing the viscosity of the grease film proportionally.

By way of example only, I have found that a cage adapted to house a ball of 11/32" diameter and a final cage width of .330" may be properly deformed by the dies when the inclined end walls 8 and 9 are substantially at an angle of 14½° to a vertical plane passed transversely through the axis of the race member. The dies have the inclined faces 27 substantially at a 25° angle relative to the axes of the bores 14 and 15. Thus the inclined surface 27 engages the annular edge between walls 6 and 7 and the inclined walls 8 and 9. The angles stated result in a proper swaging of the race member about the ball, with the result that the race member has the appearance shown in Fig. 7, the walls 6 and 7 being inclined at less than 30° to the horizontal plane. The result is that in the final trimming operation there is practically no waste metal.

It is perhaps unnecessary to state that the balls are cut so as to have parallel plane surfaces 32 and 33 perpendicular to the axis of the ball.

It is assumed that no statement of operation is required other than that which has been outlined above, which indicates not only the means but the preferred method to be followed in the practice of the invention. However, the present device has many advantages over devices now on the market, as it will be seen that the race member is in one piece and so constructed that the inner surface thereof is complementary to the periphery of the ball and will not allow the ball to escape therefrom. No amount of end pressure will release the ball from the race member when the race member is enclosed within some article such as the post shown in Fig. 9. During a swaging operation on the race member by the dies, the guide pins 18 hold the ball 1 centered, the said guide pins retracting, under spring compression, within bores 14 and 15.

I claim:

1. The method of securing a ball in an annulus within the limits of a determined tolerance range which consists in applying between the interlockable surfaces a film of high viscosity grease at room temperature, chilling the grease to increase its viscosity to a point where sufficient thickness of the film may be maintained to secure the desired tolerance under swaging pressures, thereafter swaging the annulus about the periphery of the ball so that the inner face of the annulus conforms to the curvature of the ball with the intervening grease film maintaining the tolerance equivalency desired, and thereafter washing out the grease.

2. The method of securing a ball in an annulus within the limits of a determined tolerance range which consists in applying between the interlockable surfaces a film of high viscosity grease at room temperature, chilling the grease to at least 40° F. to increase its viscosity to a point where sufficient thickness of the film may be maintained to secure the desired tolerance under swaging pressures, thereafter swaging the annulus about the periphery of the ball so that the inner face of the annulus conforms to the curvature of the ball with the intervening grease film maintaining the tolerance equivalency desired, and thereafter washing out the grease.

3. The method of securing a ball in an annulus within the limits of a pre-determined tolerance range which consists in applying between the interlockable surfaces a film of high viscosity grease, treating the grease to increase its viscosity to a point where sufficient thickness of the film may be maintained to secure the desired tolerance under swaging pressures, thereafter swaging the annulus about the periphery of the ball so that the annulus conforms to the curvature of the ball with the intervening grease film maintaining the tolerance equivalency desired, and thereafter washing out the grease.

ALFRED L. SPANGENBERG.

REFERENCES CITED

The following references are of record in the file of this patent:

UNITED STATES PATENTS

| Number | Name | Date |
| --- | --- | --- |
| 1,175,288 | Patrick | Mar. 14, 1916 |
| 1,693,748 | Fiegel et al. | Dec. 4, 1928 |
| 1,793,874 | Skillman | Feb. 24, 1931 |
| 1,798,738 | Hoern | Mar. 31, 1931 |
| 1,817,529 | Skillman | Aug. 4, 1931 |
| 1,840,638 | Scribner | Jan. 12, 1932 |
| 1,907,015 | Swart | May 2, 1933 |
| 2,366,668 | Heim | Jan. 2, 1945 |